United States Patent
An et al.

(10) Patent No.: US 10,112,567 B2
(45) Date of Patent: Oct. 30, 2018

(54) KNEE BOLSTER OF GLOVE BOX FOR VEHICLE

(71) Applicants: Hyundai Motor Company, Seoul (KR); Kia Motors Corporation, Seoul (KR); LG Hausys, Ltd., Seoul (KR); Hyundai Mobis Co., Ltd., Seoul (KR)

(72) Inventors: Jae Hyun An, Seosan-si (KR); Nam Hae Park, Seoul (KR); Yong Han Kang, Seoul (KR); Sang Hyeon Park, Cheongju-si (KR); Jong Sun Woo, Seoul (KR); Woong Young Choi, Uiwang-si (KR)

(73) Assignees: Hyundai Motor Company, Seoul (KR); Kia Motors Corporation, Seoul (KR); LG Hausys, Ltd., Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/440,567

(22) Filed: Feb. 23, 2017

(65) Prior Publication Data

US 2017/0355339 A1 Dec. 14, 2017

(30) Foreign Application Priority Data

Jun. 9, 2016 (KR) .......................... 10-2016-0071467

(51) Int. Cl.
| | |
|---|---|
| *B60R 21/045* | (2006.01) |
| *B60R 7/06* | (2006.01) |
| *B60R 21/00* | (2006.01) |
| *B29C 70/30* | (2006.01) |
| *B29K 105/08* | (2006.01) |

(Continued)

(52) U.S. Cl.
CPC ............ *B60R 21/045* (2013.01); *B29C 70/30* (2013.01); *B29K 2101/12* (2013.01); *B29K 2105/0881* (2013.01); *B29L 2031/3041* (2013.01); *B60R 7/06* (2013.01); *B60R 2021/0051* (2013.01)

(58) Field of Classification Search
CPC . B60R 21/045; B60R 2021/0051; B60R 7/06; B29L 2031/3041; B29K 2101/12; B29K 2105/0881; B29C 70/30
See application file for complete search history.

(56) References Cited

U.S. PATENT DOCUMENTS

| | | | |
|---|---|---|---|
| 5,311,960 A * | 5/1994 | Kukainis | ............... B60R 21/045 180/90 |
| 9,592,853 B2 * | 3/2017 | Aitharaju | ............... B62D 29/04 |

(Continued)

FOREIGN PATENT DOCUMENTS

| | | |
|---|---|---|
| JP | 5-201300 A | 8/1993 |
| JP | 05305850 A * | 11/1993 |

(Continued)

*Primary Examiner* — Darlene P Condra
(74) *Attorney, Agent, or Firm* — Morgan, Lewis & Bockius LLP (57) ABSTRACT

A knee bolster of a glove box for a vehicle is provided. The knee bolster of a glove box increases the stiffness of the front surface of the glove box with which the knees of a passenger may collide when a vehicle collision occurs, and thus restrains the knees of the passenger from rushing into the glove box. The knee bolster of a glove box for a vehicle can reduce the weight of the knee bolster, the production cost thereof, and a number of manufacturing processes compared to the conventional knee bolster for passenger seats.

6 Claims, 6 Drawing Sheets

(51) Int. Cl.
  *B29K 101/12* (2006.01)
  *B29L 31/30* (2006.01)

(56) References Cited

U.S. PATENT DOCUMENTS

| | | | | |
|---|---|---|---|---|
| 2002/0061383 A1* | 5/2002 | Koike | ............... | B32B 3/26 428/71 |
| 2004/0262954 A1* | 12/2004 | Scheib | ............. | B62D 25/142 296/193.02 |
| 2005/0156421 A1* | 7/2005 | Nykiel | ............. | B60R 21/045 280/752 |
| 2006/0038390 A1* | 2/2006 | Cho | ............. | B60R 21/045 280/752 |
| 2006/0111003 A1* | 5/2006 | Balthes | ............. | B29C 43/021 442/327 |
| 2006/0232051 A1* | 10/2006 | Morris | ............. | B60R 21/02 280/732 |
| 2008/0124557 A1* | 5/2008 | Freestone | ......... | B29C 44/1266 428/425.8 |
| 2011/0008566 A1* | 1/2011 | Okano | ............. | B29C 45/14311 428/58 |
| 2011/0198827 A1* | 8/2011 | Roychoudhury | ......... | B60R 7/06 280/730.2 |
| 2013/0122246 A1* | 5/2013 | Berger | ............. | F16B 5/08 428/119 |
| 2013/0328291 A1* | 12/2013 | Roychoudhury | ....... | B60R 21/02 280/728.2 |
| 2016/0129870 A1* | 5/2016 | An | ............. | B60R 21/045 280/752 |
| 2017/0259459 A1* | 9/2017 | Okunaka | ............. | B29B 11/16 |

FOREIGN PATENT DOCUMENTS

| | | |
|---|---|---|
| JP | 8-192465 A | 7/1996 |
| JP | 2006-27433 A | 2/2006 |
| JP | 3893218 B2 | 3/2007 |
| JP | 2012-158276 A | 8/2012 |
| KR | 0151666 B1 | 6/1998 |
| KR | 10-2005-0093125 A | 9/2005 |
| KR | 10-2006-0024980 A | 3/2006 |
| KR | 10-2016-0054193 A | 5/2016 |

* cited by examiner

[ A-A SECTION ]

[ B-B SECTION ]

KNEE BOLSTER OF GLOVE BOX FOR VEHICLE

CROSS-REFERENCE TO RELATED APPLICATION

The present application claims under 35 U.S.C. § his application claims priority to Korean Patent Application No. 10-2016-0071467 filed on Jun. 9, 2016, the entire contents of which are incorporated herein by reference.

BACKGROUND

Field of the Invention

The present invention relates to a knee bolster of a glove box for a vehicle. More particularly, it relates to a knee bolster of a glove box for a vehicle which increases the stiffness of a front surface of the glove box with which the knees of a passenger may collide when a vehicle collision occurs, thus restraining the knees of the passenger from rushing into the glove box.

Description of Related Art

Generally, when a vehicle which is traveling is involved in a collision, a passenger who is in the vehicle is pushed toward the front of the vehicle by inertia.

Given this, vehicles are basically provided with airbags, seat belts, etc. as safety devices for protecting passengers when a vehicle collision occurs. However, if the lower body of a passenger is pushed into a lower portion of an instrument panel in which a dashboard, a glove box or the like is installed, it is difficult for the lower body of the passenger to be reliably protected by an airbag or seat belt, and the lower body may be seriously damaged.

Therefore, to prevent the lower body of the passenger from being pushed into the lower portion of the instrument panel, a knee bolster for reducing injuries of the lower body, particularly, the knees, of the passenger is used. A knee bolster for a passenger seat is mainly installed on a front surface of the glove box.

A conventional knee bolster for a passenger seat includes a reinforced steel plate which is mounted to a housing provided on a front surface of a glove box, and a front cover which is provided to cover the reinforced steel plate. The reinforced steel plate is mounted, by a screw mounting method, to the housing provided on the front surface of the glove box. The front cover for covering the reinforced steel plate is installed on the front surface of the glove box by a vibration fusion method.

However, the conventional knee bolster having the above-mentioned configuration increases the weight of the vehicle due to characteristics of the material, thereby causing a reduction in fuel efficiency. Further, because of the assembly methods such as the screw mounting method and the vibration fusion method, the number of assembly processes is increased, whereby the production cost is increased. In addition, an increase in the weight of the glove box makes it difficult to control the speed at which the glove box opens, thus causing a reduction in quality. Furthermore, since the thickness of the front surface of the glove box is increased, the storage capacity of the glove box is reduced, and the appearance of the glove box deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a knee bolster of a glove box for a vehicle which increases the stiffness of a front surface of the glove box with which the knees of a passenger may collide when a vehicle collision occurs, thus restraining the knees of the passenger from rushing into the glove box, wherein the weight of the knee bolster, the production cost thereof, and the number of manufacturing processes can be reduced compared to those of the conventional knee bolster for passenger seats.

In one aspect, the present invention provides a knee bolster provided on a glove box for a vehicle, including: a composite-material reinforced plate installed on a front surface of the glove box with which knees of a passenger collide when a vehicle collision occurs, wherein the composite-material reinforced plate is formed of a plurality of composite-material sheets, each of which includes continuous fibers oriented in one direction, the plurality of composite-material sheets being stacked in a predetermined pattern on a basis of a continuous-fiber orientation.

In an exemplary embodiment, each of the composite-material sheets may be formed by impregnating the continuous fibers having one identical orientation into thermoplastic.

In another exemplary embodiment, the front surface of the glove box may be provided with a housing to which the composite-material reinforced plate is mounted, and be mounted with a front cover covering the housing to which the composite-material reinforced plate is mounted.

In still another exemplary embodiment, the housing may include: a plurality of fusing ribs passing through the composite-material reinforced plate and bonded to the front cover; and a plurality of hooks configured to fix the composite-material reinforced plate to the housing. A left support bracket and a right support bracket that are configured to restrain the knees of the passenger from rushing into the glove box may be installed between a cowl cross bar disposed in front of the glove box and the front surface of the glove box on which the composite-material plate is installed.

In yet another exemplary embodiment, the composite-material reinforced plate may be configured by stacking the plurality of composite-material sheets such that the continuous fibers of all of the composite-material sheets are arranged in the same direction. In detail, the composite-material reinforced plate may be configured such that each of the continuous fibers has an orientation of 0°. Alternatively, the composite-material reinforced plate may be configured such that each of the continuous fibers has an orientation of 90°.

In still yet another exemplary embodiment, the composite-material reinforced plate may be configured by stacking the composite-material sheets having different continuous-fiber orientations according to a predetermined ratio on the basis of an entire thickness of the composite-material reinforced plate.

In a further exemplary embodiment, the composite-material sheets stacked to form the composite-material reinforced plate may include a composite-material sheet having continuous fibers oriented to extend in a transverse direction, a composite-material sheet having continuous fibers oriented to extend in a longitudinal direction, and a composite-material sheet having continuous fibers oriented to extend in an inclined direction.

A knee bolster of a glove box for a vehicle according to the present invention employs a composite-material reinforced plate using continuous fiber composite material. Therefore, the knee bolster can restrain the knees of a passenger from rushing into the glove box and thus reduce injures of the knees, and also effectively increase the stiffness of the front surface of the glove box against an impact load on the same thickness basis, compared to that of the conventional knee bolster for passenger seats. Accordingly, the weight and thickness of the composite-material reinforced plate can be reduced in providing the same level of performance. Therefore, the composite-material reinforced plate according to the present invention is advantageous in that the production cost can be reduced, and the storage capacity and the quality of the glove box can be enhanced.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention is intended to provide a knee bolster of a glove box for a vehicle, which prevents the knees of a passenger from rushing into the glove box when a vehicle collision occurs, thus minimizing an injury of the passenger, and which is configured to reduce the weight, the production cost and the number of manufacturing processes and enhance the storage capacity and the quality of the glove box, compared to those of the conventional knee bolster for passenger seats.

Hereinafter, various embodiments of the present invention will be described below in detail with reference to the accompanying drawings.

Figure 1:
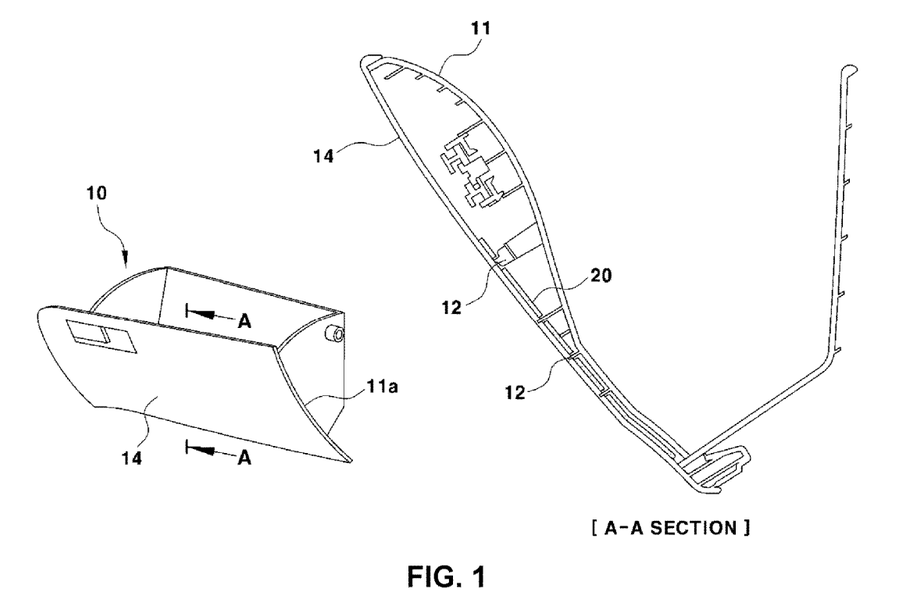
FIG. 1 shows a perspective view and a sectional view of a knee bolster of a glove box for a vehicle according to an embodiment of the present invention.
Figure 2:
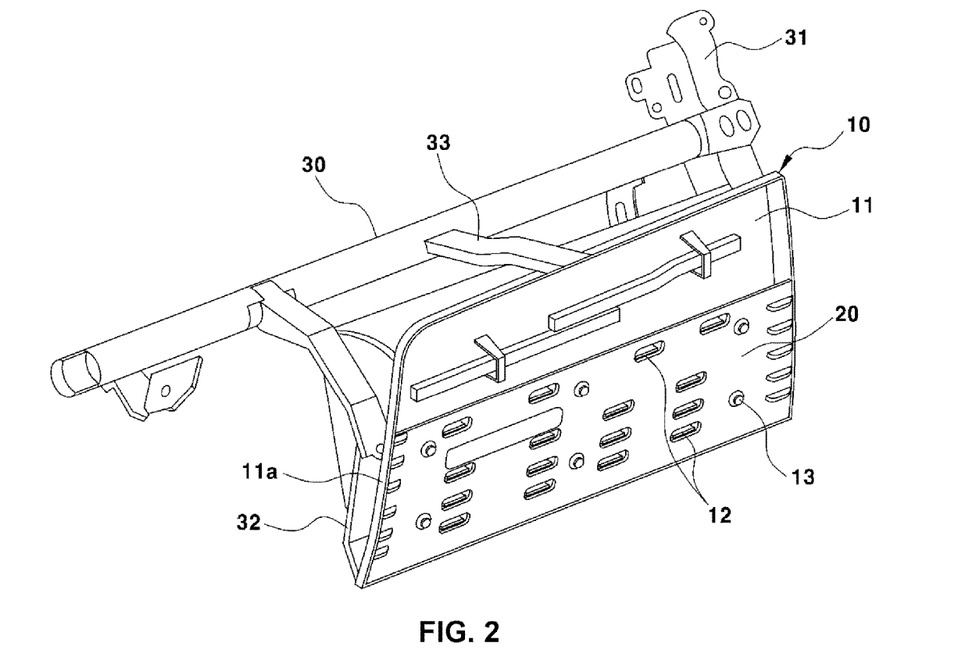
FIG. 2 is a perspective view illustrating a glove box, which is provided with a composite-material reinforced plate, and from which a front cover has been removed, according to the embodiment of the present invention.

As shown in FIGS. 1 and 2, a glove box 10 for a vehicle includes a composite-material reinforced plate 20 installed on a front surface of the glove box 10 with which the knees of a passenger may collide when a vehicle collision occurs. The front surface of the glove box 10 provided with composite-material reinforced plate 20 is used as a structure (that is, a knee bolster) provided for reducing injuries of the knees.

The glove box 10 having the above-mentioned structure is installed at a lower position in front of a passenger seat such that the knees of the passenger are protected by the structure. The glove box 10 is rotatably supported by a bracket 31 installed on a cowl cross bar 30 that is one of vehicle body structures, and thus is configured such that a receiving space defined in the glove box 10 can be opened and closed.

A housing 11 to which the composite-material reinforced plate 20 is mounted is formed on the front surface of the glove box 10. A front cover 14 is provided on the front surface of the glove box 10 so as to cover (close) the housing 11 to which the composite-material reinforced plate 20 is mounted.

In this regard, the forward direction or the rearward direction is determined on the basis of the forward and rearward directions of the vehicle. Space behind the glove box 10 corresponds to space in which the passenger has a seat (the passenger seat). Hence, the knees of the passenger are located behind the glove box 10. The front surface of the glove box 10 on which the composite-material reinforced plate 20 is installed is a front portion of the glove box 10 that is defined on the basis of the front and rear directions relative to the passenger who is sitting on the passenger seat. The front surface of the glove box 10 is a part, with which the knees of the passenger pushed toward the front of the vehicle when a vehicle collision occurs may collide.

The composite-material reinforced plate 20 increases the stiffness of the front surface of the glove box 10 so as to restrain or prevent the knees of the passenger that strike the front surface of the glove box 10 from rushing into the front portion of the vehicle. The glove box 10 having the composite-material reinforced plate 20 is configured with a pair of support brackets 32 and 33 installed on the cowl cross bar 30 so as to more reliably restrain the knees from rushing into the glove box 10. In other words, when the vehicle collision occurs, the glove box 10 having the composite-material reinforced plate 20 absorbs the impact to be applied to the knees and restrains the knees from rushing into the glove box 10.

The composite-material reinforced plate 20 may be made of continuous fiber thermoplastic (CFT) capable of enhancing the stiffness of the front surface of the glove box 10.

Figure 3:
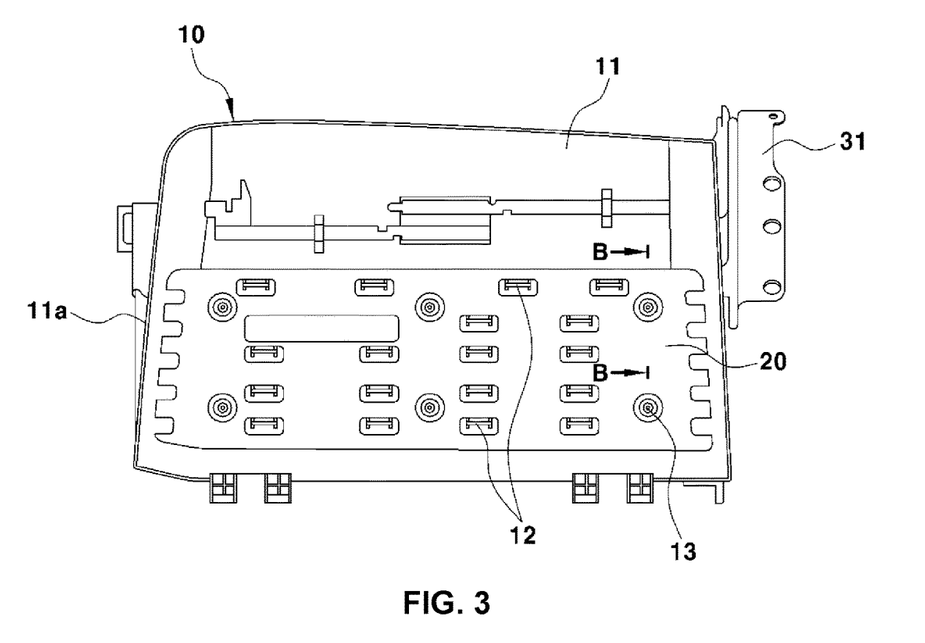
FIG. 3 is a front view illustrating the glove box, which is provided with the composite-material reinforced plate, and from which the front cover has been removed, according to the embodiment of the present invention.
Figure 4:
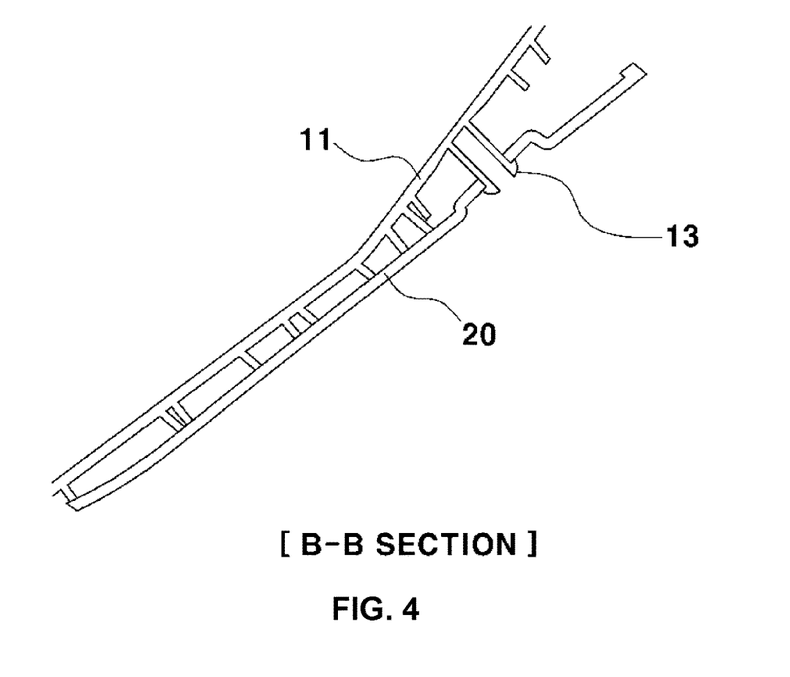
FIG. 4 is a sectional view taken along line B-B of FIG. 3.
Figure 5:
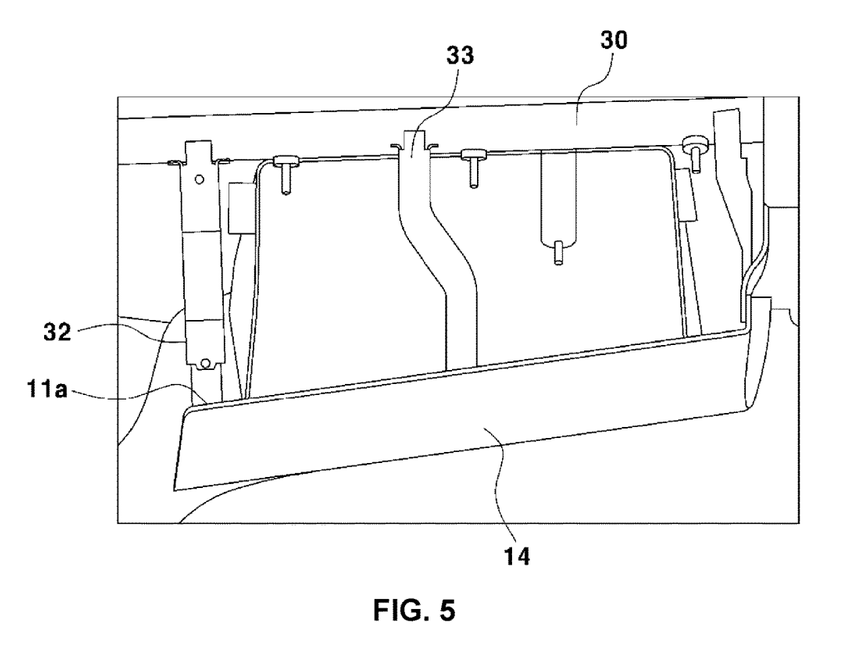
FIG. 5 is a plan view illustrating a left support bracket and a right support bracket according to the embodiment of the present invention.

FIGS. 2 and 3 illustrate the embodiment in which the composite-material reinforced plate is installed on a lower portion of the housing of the glove box. FIG. 4 illustrates an assembly structure of the composite-material reinforced plate for locking the composite-material reinforced plate when the front cover is mounted to the front surface of the glove box. FIG. 5 illustrates the support brackets installed between the glove box and the cowl cross bar.

Referring to FIGS. 2 and 3, the composite-material reinforced plate 20 is disposed on the lower portion of the housing 11 of the glove box 10. The housing 11 is provided with a plurality of fusing ribs 12, which pass through the composite-material reinforced plate 20 and are bonded to the front cover 14.

The fusing ribs 12 are bonded at a plurality of positions to the inner surface of the front cover 14 by vibration-fusion, in the form of passing through the composite-material reinforced plate 20. To fix the composite-material reinforced plate 20 when the front cover 14 is attached to the fusing ribs 12 by vibration-fusion, a hook 13 protrudes from the housing 11. The composite-material reinforced plate 20 is pressed onto and hooked to the hook 13, whereby the composite-material reinforced plate 20 can be fixed to and supported on the housing 11 without being separated therefrom.

Therefore, when the vibration-fusion is performed after the composite-material reinforced plate 20 has been inserted between the housing 11 and the front cover 14 of the glove box 10, the composite-material reinforced plate 20 can be maintained at a predetermined fixed position in the housing 11 by the hook 13.

As such, because a vibration-fusion or screw mounting method is not used when the composite-material reinforced plate 20 is mounted in the housing 11 of the glove box 10, the assembly process is simplified, and thus the effect of reducing the production cost can be obtained.

In this regard, the hook 13 can also function to guide the composite-material reinforced plate 20 to the assembly position at which the composite-material reinforced plate 20 is mounted to the housing 11.

Referring to FIG. 5, on the basis of the forward and rearward directions of the vehicle, so as to prevent the knees from rushing into the glove box 10, the support brackets 32 and 33 are disposed between the cowl cross bar 30 that is a vehicle body structure installed ahead of the glove box 10 and the front surface of the glove box 10 on which the composite-material reinforced plate 20 is installed.

In detail, the support brackets 32 and 33 include the left support bracket 32 and the right support bracket 33 which are disposed at positions spaced apart from each other in the longitudinal direction of the cowl cross bar 30. The support brackets 32 and 33 are provided adjacent to a predetermined position of the glove box 10 in consideration of a position at which the knees of the passenger rush into the glove box 10 when the vehicle collision occurs.

According to a collision analysis using a test dummy, the right knee of the passenger who is sitting on the passenger seat strikes a central portion of the front surface of the glove box 10, and the left knee of the passenger strikes a left portion of the front surface of the glove box 10. Given this, as shown in FIG. 5, the left support bracket 32 and the right support bracket 33 are respectively disposed on a flange 11a at the left portion of the front surface of the glove box 10 and on a central upper portion of the front surface of the glove box 10.

In this regard, the composite-material reinforced plate 20 installed on the housing 11 of the glove box 10 is disposed such that, on the basis of the forward and rearward directions of the vehicle, the composite-material reinforced plate 20 overlaps rear portions of the left and right support brackets 32 and 33 so as to uniformly distribute an impact load to the support brackets 32 and 33, thus making the same load be applied to both knees of the passenger.

In addition, to make it possible to open and close the receiving space of the glove box 10, each of one end of the left and right support brackets 32 and 33 is bonded and fixed to the cowl cross bar 30, and each of the other end thereof is disposed adjacent to the glove box 10 when the glove box 10 is in a closed state.

The composite-material reinforced plate 20 is formed by stacking a plurality of composite-material sheets 21 made of CFT. The process of manufacturing the composite-material reinforced plate 20 in a planar shape includes stacking the plurality of composite-material sheets 21 in a predetermined pattern, preheating it to a high temperature, and pressing it.

The CFT is composite material formed of continuous fibers and thermoplastics and is formed by impregnating continuous fibers (long fibers) into thermoplastics. In this regard, glass fiber (GF), carbon fiber (CF), etc. may be used as a continuous fiber that is impregnated in the thermoplastics while having continuity and directionality (orientation). Polypropylene (PP), polyamide (PA), polyethylene terephthalate (PET), etc. may be used as the thermoplastics.

Each composite-material sheet 21 is processed by impregnating widened continuous fibers in thermoplastics to have a unidirectional orientation. Thereafter, cooling, ejecting, and laminating the thermoplastics in which the continuous fibers are impregnated are performed.

The plurality of composite-material sheets 21 formed by such a method are preheated and thereafter processed by pressing. Then, the plurality of composite-material sheets 21 are bonded to each other, thus forming the composite-material reinforced plate 20.

As such, when the composite-material reinforced plate 20 is manufactured, the composite-material sheets 21 may be stacked in a predetermined pattern depending on orientations of the continuous fibers. That is, the continuous fibers in the composite-material reinforced plate 20 are stacked to have a multilayer structure with orientation of a predetermined pattern.

The support stiffness of the composite-material reinforced plate 20 can be controlled on the same thickness basis, depending on a pattern of stacking the composite-material sheets 21. The pattern of stacking the composite-material sheets 21 for controlling the support stiffness of the composite-material reinforced plate 20 will be described in more detail with reference to FIGS. 6 to 11.

FIGS. 6 to 11 illustrate examples of the pattern of stacking continuous fibers of the composite-material reinforced plate formed of the plurality of composite-material sheets (or the pattern of stacking the composite-material sheets).

Figure 6:
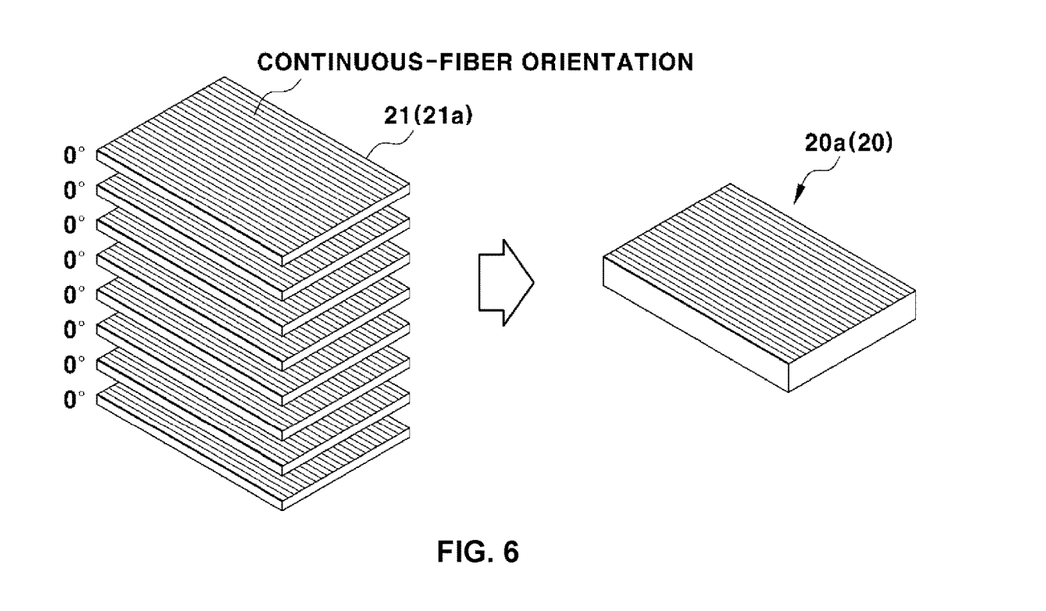
FIG. 6, FIG. 7, FIG. 8, FIG. 9, FIG. 10, and FIG. 11 are views showing examples of a pattern of staking continuous fibers of the composite-material reinforced plate according to the embodiment of the present invention.

As shown in FIG. 6, the composite-material reinforced plate 20a may be formed in such a way that the composite-material sheets 21a having unidirectional orientation (in which internal continuous fibers are arranged in the same direction) are stacked to be oriented in one direction on the basis of the orientation of the continuous fibers. In this case, not only the continuous fibers arranged in each composite-material sheet 21a but also the continuous fibers stacked between the plurality of composite-material sheets 21a are oriented in the same direction.

In this composite-material reinforced plate 20a, the continuous fibers oriented to extend in a transverse (horizontal) direction on the front surface of the glove box 10 form a multilayer structure in which the continuous fibers are stacked in the thickness direction of the composite-material reinforced plate 20a.

That is, the composite-material sheets 21a having directionality (orientation) of 0° on the basis of the left and right directions of the vehicle, in other words, the composite-material sheets 21a having horizontal directionality are stacked in a single pattern in which the orientations of the continuous fibers correspond to each other. In this way, as shown in FIG. 6, a unidirectional composite-material reinforced plate 20a having the directionality of 0° can be manufactured.

Figure 7:
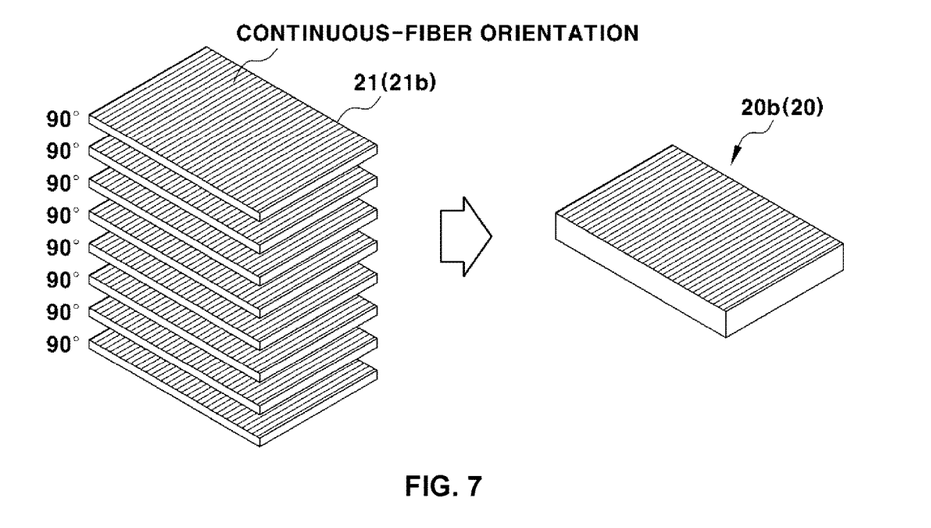

Furthermore, the composite-material reinforced plate 20 is formed by stacking the unidirectional composite-material sheets 21 to be oriented in the only one direction on the basis of the orientation of the continuous fibers, wherein the composite-material reinforced plate 20 may be configured such that the continuous fibers are arranged to be oriented in a longitudinal (vertical) direction on the front surface of the glove box 10. In this case, composite-material sheets 21b having directionality (orientation) of 90° on the basis of the left and right directions of the vehicle, in other words, the composite-material sheets 21b having vertical directionality are stacked in a single pattern in which the orientations of the continuous fibers correspond to each other. Thereby, as shown in FIG. 7, a unidirectional composite-material reinforced plate 20b having the directionality of 90° can be manufactured.

In this regard, the orientation of the continuous fibers according to the stacking pattern is on the basis of the left and right directions of the vehicle. The composite-material reinforced plate 20 is not limited by the above-mentioned patterns of stacking the continuous fibers. That is, the composite-material reinforced plate 20 according to the present invention may function to absorb and uniformly disperse an impact load of the knees that strike the glove box 10, regardless of the pattern of stacking the continuous fibers. However, considering that the composite-material reinforced plate 20 aims to increase the support stiffness of the front surface of the glove box 10, the composite-material reinforced plate in which interlayer continuous fibers are stacked to have the directionality of 0° can more effectively absorb and disperse the impact load on the same thickness basis.

In the case of the composite-material reinforced plate 20a in which interlayer continuous fibers are stacked to be oriented at 0°, when the knees of the passenger strike the composite-material reinforced plate 20a, transverse rupture is caused due to the orientation of the continuous fibers. Thereby, since rupture proceeds as if the composite-material reinforced plate 20a contracts in the longitudinal direction, it is advantageous for ruptures of the lower portion of the glove box 10. Therefore, during the collision, the impact load can be more effectively absorbed and dispersed.

Figure 8:
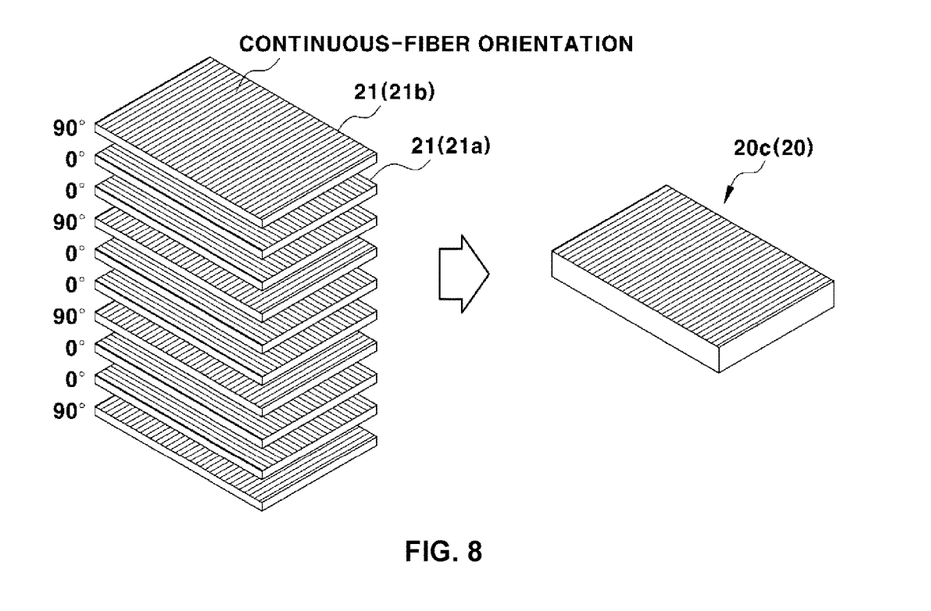

As shown in FIG. 8, when the composite-material sheets 21 each of which has continuous fibers having a unidirectional orientation are stacked, they may be stacked such that continuous fibers included in the respective composite-material sheets 21 are perpendicular to each other.

In other words, a stacking pattern in which the unidirectional continuous fibers that are stacked in the thickness direction of the composite-material reinforced plate 20c are perpendicular to each other between the layers may be used.

The composite-material reinforced plate 20c manufactured in this way includes at least one composite-material sheet 21a including continuous fibers oriented at 0° and at least one composite-material sheet 21b including continuous fibers oriented at 90°.

For example, as shown in FIG. 8, in a composite-material reinforced plate 20c formed of ten layers of composite-material sheets 21, the composite-material sheets 21a including continuous fibers oriented at 0° and composite-material sheet 21b including continuous fibers oriented at 90° are stacked at a ratio of 2:1. In detail, the continuous fibers of first, fourth, seventh and tenth layers are stacked to be oriented at 90°, and the continuous fibers of the other layers are stacked to be oriented at 0°.

In this stacking pattern, the composite-material reinforced plate 20c is formed by stacking the composite-material sheets 21a and 21b having different continuous-fiber orientations according to a predetermined ratio on the basis of the entire thickness of the composite-material reinforced plate 20c. This stacking pattern can be more advantageously used when the stiffness of the composite-material reinforced plate 20c and the support orientation of 0° are important factors.

Figure 9:
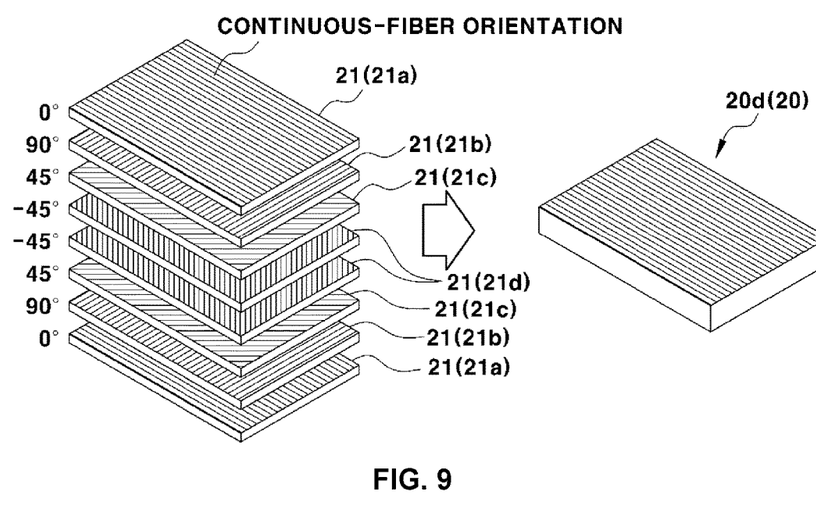
Figure 10:
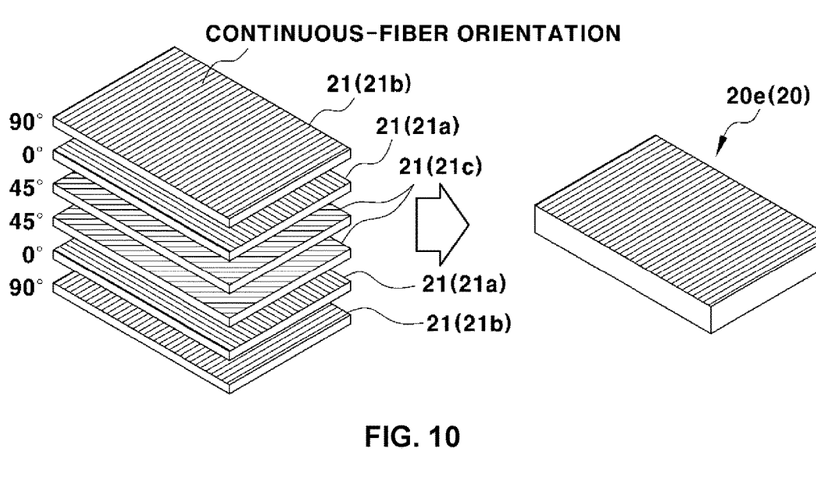
Figure 11:
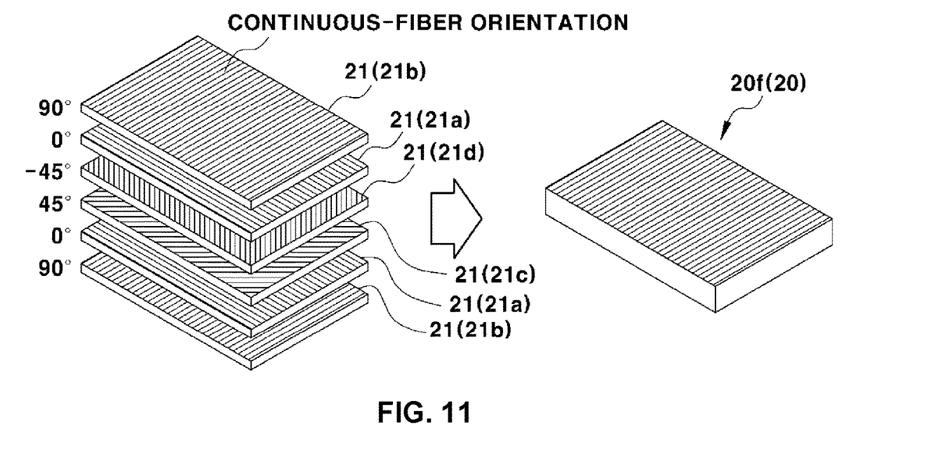

As shown in FIGS. 9 to 11, the composite-material reinforced plate 20 may be formed to include not only continuous fibers oriented in the transverse or longitudinal direction but also continuous fibers having orientation of an inclined angle relative to the left and right directions of the vehicle, that is, continuous fibers oriented in an inclined direction. In this regard, the angle of the inclined direction of the continuous fibers on the front surface of the glove box 10 may be an arbitrary angle within a range from 0° to 90°.

As such, to form the composite-material reinforced plate 20 using composite-material sheets 21 having two or more different continuous-fiber orientations, the composite-material reinforced plate 20 may be formed in such a way that the entire thickness of the composite-material reinforced plate 20 is divided at a predetermined ratio, and composite-material sheets 21 having different continuous-fiber orientations are stacked.

For example, proportions at which composite-material sheets 21 having different continuous-fiber orientations are stacked may be the same as each other.

First, as shown in FIG. 9, a composite-material reinforced plate 20d may be manufactured by combining and stacking composite-material sheets 21b in which continuous fibers are oriented to extend in the transverse direction, composite-material sheets 21a in which continuous fibers are oriented to extend in the longitudinal direction, and composite-material sheets 21c and 21d in which continuous fibers are oriented to extend in inclined directions. In detail, the composite-material reinforced plate 20d may be configured by combining and stacking the composite-material sheets 21a having continuous-fiber orientation of 0°, the composite-material sheets 21b having continuous-fiber orientation of 90°, the composite-material sheets 21c having continuous-fiber orientation of +45°, and the composite-material sheets 21d having continuous-fiber orientation of −45°.

In this regard, a sequence in which the composite-material sheets 21 having different continuous-fiber orientations are stacked may have an effect on controlling the stiffness of the composite-material reinforced plate 20.

In the case of the composite-material reinforced plate 20d shown in FIG. 9, the composite-material sheets 21a having continuous-fiber orientation of 0° are disposed in the outermost layers, the composite-material sheets 21d having continuous-fiber orientation of −45° are disposed in the innermost layers, and the composite-material sheets 21b having continuous-fiber orientation of 90° and the composite-material sheets 21c having continuous-fiber orientation of +45° are disposed in layers between the outermost layers and the innermost layers.

In the case of a composite-material reinforced plate 20e shown in FIG. 10, the composite-material sheets 21b having continuous-fiber orientation of 90° are disposed in the outermost layers, the composite-material sheets 21c having continuous-fiber orientation of +45° are disposed in the innermost layers, and the composite-material sheets 21a having continuous-fiber orientation of 0° are disposed in layers between the outermost layers and the innermost layers In the case of a composite-material reinforced plate 20f shown in FIG. 11, the composite-material sheets 21b having continuous-fiber orientation of 90° are disposed in the outermost layers, the composite-material sheets 21c and 21d having continuous-fiber orientations of +45° and −45° are disposed in the innermost layers, and the composite-material sheets 21a having continuous-fiber orientation of 0° are disposed in layers between the outermost layers and the innermost layers.

As such, in the composite-material reinforced plate 20 according to the present invention, various patterns of stacking the composite-material sheets 21 can be used depending on a stiffness design of the front surface of the glove box 10. Particularly, as the number of continuous-fiber orientations is increased, it is advantageous for increasing the stiffness of the composite-material reinforced plate 20. However, as the continuous-fiber orientations are diversified, the production cost of the composite-material reinforced plate 20 is increased on the same thickness basis. Therefore, it is important to increase the stiffness of the composite-material reinforced plate 20 with minimal production cost through the optimization of the pattern of stacking continuous fibers.

Meanwhile, unlike the unidirectional composite-material sheet 21 in which continuous fibers are arranged in a single direction, a composite-material sheet may be formed in such a way that continuous fibers are woven with each other in a manner similar to that of a mesh to have a fabric shape, and the woven-shaped continuous fibers are impregnated in thermoplastics. Such composite-material sheets having woven-shaped continuous fibers may be stacked to have a multilayer structure, thereby forming a composite-material reinforced plate having a structure in which continuous fibers arranged in a mesh-type woven shape are stacked in thermoplastics to have a multilayer structure.

In the case of the composite-material reinforced plate 20c shown in FIG. 8, horizontal continuous fibers oriented to extend in the horizontal direction and vertical continuous fibers oriented to extend in the vertical direction are stacked such that the continuous fibers are perpendicular to each other between layers. In this case, when viewed in a plan view, the continuous fibers intersect each other, but when viewed in a side view, the continuous fibers do not intersect each other. On the other hand, in the case where the composite-material reinforced plate is manufactured using composite-material sheets including continuous fibers woven in a mesh shape, the continuous fibers intersect each other not only when viewed in a plan view but also when viewed in a side view.

As described above, the composite-material reinforced plate 20 to be inserted into the front surface of the glove box 10 can be manufactured in various stacking patterns in consideration of the orientation of continuous fibers. Therefore, an increase or reduction in the support stiffness of the composite-material reinforced plate 20 can be controlled depending on the method of stacking the composite-material sheets 21 in consideration of the orientation of the continuous fibers. Hence, in the composite-material reinforced plate 20, the amount of use and weight of continuous fiber composite material on the same thickness basis can be optimized, and the production cost required to manufacture the composite-material reinforced plate 20 can be reduced.

Compared to the conventional knee bolster for passenger seats, on the same thickness basis, the composite-material reinforced plate 20 can effectively enhance the stiffness of the front surface of the glove box 10 against an impact load. Given this, the weight and thickness of the composite-material reinforced plate 20 can be reduced in providing the same level of performance. Therefore, the composite-material reinforced plate 20 according to the present invention is advantageous in that the production cost can be reduced, and the storage capacity and the quality of the glove box can be enhanced.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A knee bolster provided on a glove box for a vehicle, comprising:
   a composite-material reinforced plate installed on a front surface of the glove box with which knees of a passenger collide when a vehicle collision occurs,
   wherein the composite-material reinforced plate is formed of a plurality of composite-material sheets, in which continuous fibers are oriented in one direction, the plurality of composite-material sheets being stacked in a predetermined pattern on a basis of a continuous-fiber orientation, and
   wherein the composite-material sheets stacked to form the composite-material reinforced plate comprise a composite-material sheet having continuous fibers oriented to extend in a transverse direction thereof, a composite-material sheet having continuous fibers oriented to extend in a longitudinal direction thereof, and a composite-material sheet having continuous fibers oriented to extend in an inclined direction thereof.

2. The knee bolster of claim 1, wherein a housing to which the composite-material reinforced plate is mounted is provided on the front surface of the glove box, and a front cover covering the housing to which the composite-material reinforced plate is mounted is provided on the front surface of the glove box.

3. The knee bolster of claim 2, wherein the housing comprises: a plurality of fusing ribs passing through the composite-material reinforced plate and bonded to the front cover; and a plurality of hooks configured to fix the composite-material reinforced plate to the housing.

4. The knee bolster of claim 1, wherein a first support bracket and a second support bracket that are configured to restrain the knees of the passenger from rushing into the glove box are installed between a cowl cross bar disposed in front of the glove box and the front surface of the glove box on which the composite-material reinforced plate is installed.

5. The knee bolster of claim 1, wherein the composite-material reinforced plate is configured by stacking the composite-material sheets having different continuous-fiber orientations according to a predetermined ratio on a basis of an entire thickness of the composite-material reinforced plate.

6. The knee bolster of claim 1, wherein each of the composite-material sheets is formed by impregnating the continuous fibers having one identical orientation into thermoplastics.

* * * * *